MARY F. RATHBUN.
Lamp-Stoves.
No. 166,892. Patented Aug. 17, 1875.
FIG I
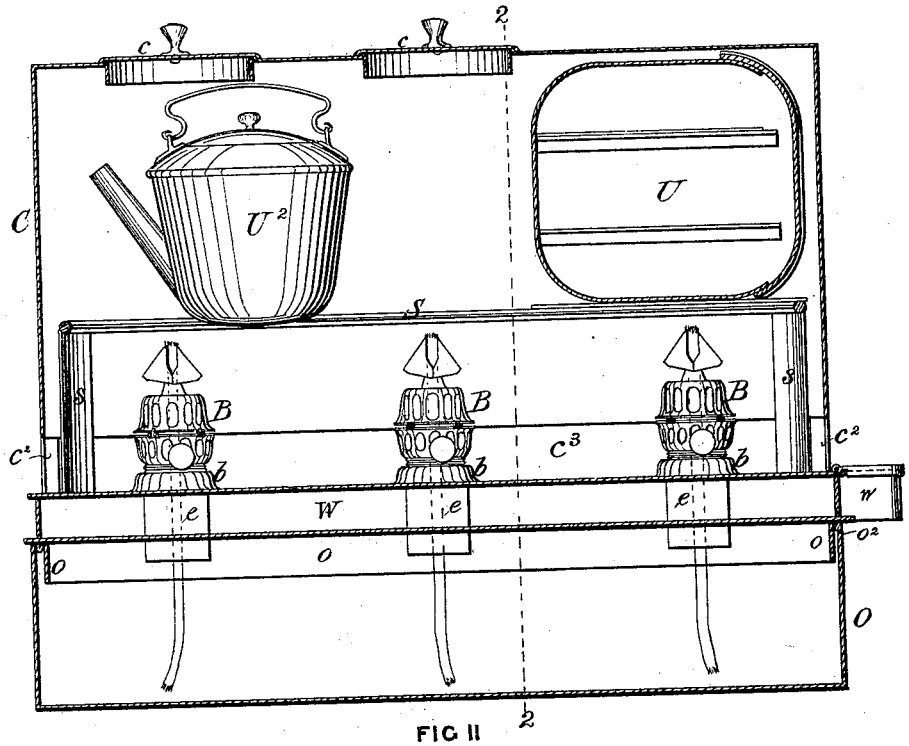
FIG II
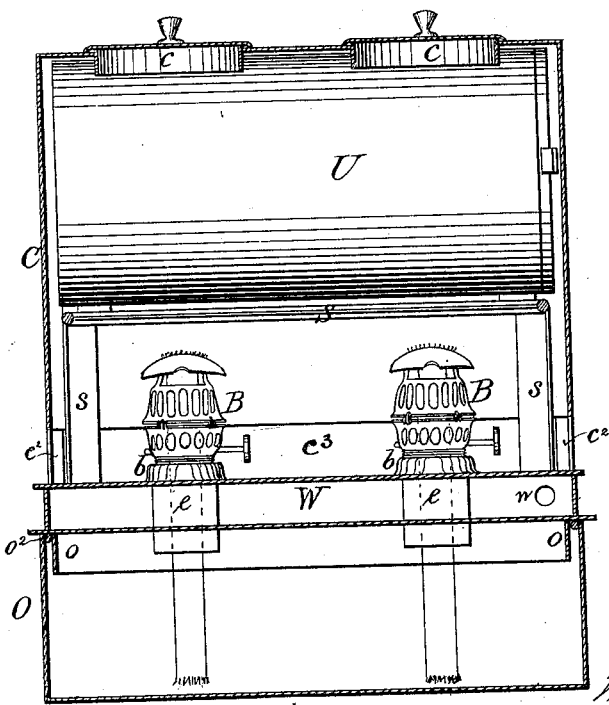
WITNESSES
John E. Laing.
J. H. Rutherford
INVENTOR
Mary F. Rathbun
by Johnson and Johnson
her Attorneys

UNITED STATES PATENT OFFICE.

MARY F. RATHBUN, OF OWEGO, NEW YORK.

IMPROVEMENT IN LAMP-STOVES.

Specification forming part of Letters Patent No. 166,892, dated August 17, 1875; application filed January 2, 1875.

*To all whom it may concern:*

Be it known that I, MARY F. RATHBUN, of Owego, in the county of Tioga and State of New York, have invented certain new and useful Improvements in Portable Cooking-Stoves; and I do hereby declare that the following is a full, clear, and exact description thereof, which will enable others skilled in the art to which it pertains to make and use the same, reference being had to the accompanying drawing, and to the letters of reference marked thereon, which form a part of this specification.

This invention relates to portable and summer cooking apparatus, and to what are termed "petroleum or coal-oil stoves;" and it consists of a peculiarly-constructed stove of this description, as hereinafter set forth.

The primary object of the invention is to afford facilities for cooking one or more objects at a time with convenience, rapidity, and economy. Another object of the invention is to provide for using ordinary petroleum or coal-oil as a fuel with safety.

The improved portable stove is small and compact, so as to be convenient to carry and economical of room; it is simple in construction, so as to be manufactured and sold at low prices, and so as to be used by unskilled persons, and it is as safe as any ordinary lamp.

The novelty of the invention consists in a peculiar combination of parts for supporting the cooking-vessel, and applying heat thereto on all sides, and in peculiar provisions for filling and isolating the reservoir.

Figure 1 is a vertical longitudinal section of a portable cooking-stove illustrating this invention. Fig. 2 is a transverse section on the line 2 2, Fig. 1.

A hollow rectangular base, O, forms the oil-reservoir of this improved portable stove. Detached, it is a simple pan, and in this condition it is filled with rapidity and ease, and without danger of an explosion, as the gases which may have risen from the oil are not confined. The superstructure consists of a flat horizontal hollow plate, W, forming a cap for the oil-reservoir, and a water-chamber to isolate or protect the oil from heat; a number of suitable burners, B, and a skeleton frame or stand, S, supported by the water-plate; and a movable close hood or cover, C, which rests on the water-plate at its edges, and incloses the stand S; and the cooking vessels or utensils U U$^2$ thereon, so as to confine the heat which is radiated within a closed removable cap, provided with legs, and a surrounding air-space formed thereby above the water-plate, to expose the whole upper surface thereof to ventilation and giving air to the burners.

The closed water-protection plate carries the burners, and is provided with tubes, which pass through the closed water-chamber, while the oil-reservoir is closed by the water-plate fitting therein by means of a marginal flange, to form with the wired edges a close joint, and allow the water-plate with its burners to be removed from the reservoir, to allow it to be quickly and easily filled and prevent explosions. The cover C also serves to confine the gases which escape from articles of food while they are being cooked, and it is provided with holes $c\ c$ in its flat top, and may have larger apertures in its sides for access to the cooking-vessels, all closed, when not in use, by tight lids or doors. The cover is elevated by legs $c^2$, to admit air to supply the flames.

The cooking-vessels preferably employed for a stove of medium size are, a movable oven, U, and six kettles, U$^2$, four of the latter to be furnished with lids simply, one with a spout, and one with a nose, all to be made of thin metal, and to have convex bottoms, as in the illustration, for the transmission of heat. A stove of the size referred to would be thirty inches long by twenty inches wide.

The skeleton-stand S is attached to the water-plate by sufficiently strong legs $s$ of sheet metal. Its horizontal portion is made of wire, by preference, with simple rings over each burner and connecting-stays.

The burners B operate independently of each other, so that one or more may be used. One is arranged beneath each ring of the stand, and two or more beneath the oven. The employment of four burners beneath the oven, so arranged as that their flames shall partially envelop its sides, is proposed.

The water-plate W has seven collars, $b$, to receive the burners, and it has walled apertures $e$ of the same size beneath these to accommodate the wick-tubes. A horizontal spout, $w$, with a hinged lid, provides for introducing and withdrawing the water, and gives vent to air and steam. A vertical marginal flange, $o$, supports the water-plate laterally on the oil-reservoir. The latter has wired upper edges $o^2$ to support the water-plate.

The oil-reservoir, water-plate, and cover may be made of any suitable sheet metal or metals.

The open space $c^3$ extends all round and above the water-protection plate W, and, while serving to expose the entire surface of the plate, affords the necessary ventilation to the burners. An open water-pan protection has been used in petroleum-stoves, so also have the oven and cooking-vessels been supported upon a skeleton frame, in connection with burners supplied from a reservoir below, and these things are not specifically claimed by me.

The following is claimed as new, namely:

1. The combination, with the closed movable cap C, provided with the open space $c^3$, of the inner stand $s$ for cooking-vessels, the burners B, and the closed water-protection plate W, whereby the heat is supplied to all sides of the cooking-vessels within the chamber of the cap, and the reflection of the heat therefrom upon the surface-water prevented.

2. The water-plate W, provided with the burners B, in combination with the walled apertures or tubes, passing directly through the water in the chambered plate, to accommodate the wick-tubes, and keep them from being unduly heated, as shown and described.

3. The open-top reservoir O and the closed water-protection cover W, fitted within each other by the vertical marginal flange $o$, whereby the water-plate, with its burners, may be removed from the reservoir to allow it to be filled quickly and easily, and prevent explosions.

In testimony that I claim the foregoing as my own I have affixed my signature in presence of two witnesses.

MARY F. RATHBUN.

Witnesses:
S. W. TREAT,
WM. HENDERSON.